No. 689,247. Patented Dec. 17, 1901.
P. W. TILLINGHAST.
WHEEL TIRE AND MEANS FOR SECURING IT ON WHEELS.
(Application filed Apr. 3, 1900.)
(No Model.)

WITNESSES.
Charles T. Hannigan
Edgar W. Allen

INVENTOR.
Pardon W. Tillinghast

UNITED STATES PATENT OFFICE.

PARDON W. TILLINGHAST, OF EDGEWOOD, RHODE ISLAND.

WHEEL-TIRE AND MEANS FOR SECURING IT ON WHEELS.

SPECIFICATION forming part of Letters Patent No. 689,247, dated December 17, 1901.

Application filed April 3, 1900. Serial No. 11,390. (No model.)

*To all whom it may concern:*

Be it known that I, PARDON WILBUR TILLINGHAST, a citizen of the United States, residing at Edgewood, in the county of Providence and State of Rhode Island, have invented certain new and useful Improvements in Wheel-Tires and Means for Securing Them on the Wheels, of which the following is a specification.

My invention is applicable to bicycle-wheels, but is designed more particularly for use on the wheels of carriages and automobiles; and it consists, essentially, of a tire with a fixed inner diameter at its attaching-surface, in combination with channel rings or wedges, forming a tire-seat, one or both of the rings being adjustable laterally to exert a radially-expanding force against the fixed inner diameter of the tire to hold it on the wheel.

All varieties of tires, including solid, cushion, and pneumatic, of both the single and double tube styles, can be secured to the wheel by an adaptation of my invention.

Heretofore various tires have been used and many fastening devices employed to secure said tires to wheels—such as wires, bands, and like appliances, which are drawn tightly around the rim of the wheel, with the tire in place and then welded or otherwise secured. Carriage-tires have been secured to the wheel by means of a beveled rim. It is also customary to secure pneumatic carriage and automobile tires to the wheel-rim by means of clamping devices located at intervals in the attaching portion of the tire. The said tire being held only at points in the immediate vicinity of the clamping devices is allowed more or less movement between the said clamping devices and along the edges of the rim; and it is the object of my invention to avoid the consequent wear and premature ruin of the tire and manufacture a durable safe tire and a secure attachment. The desired result is accomplished as hereinafter set forth.

Figure 1:
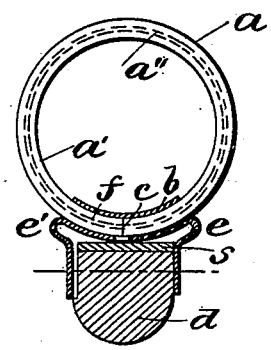
Figure 2:
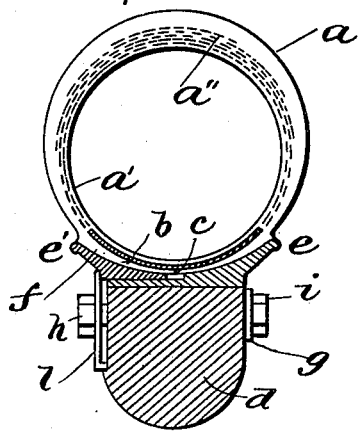
Figure 3:
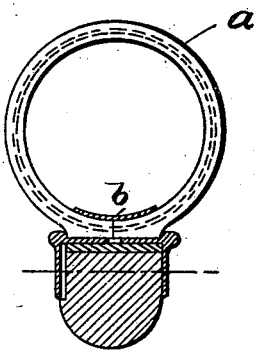
Figure 4:
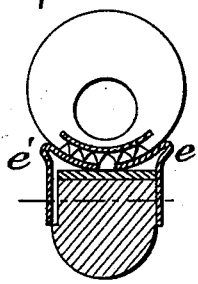
Figures 5, 6:
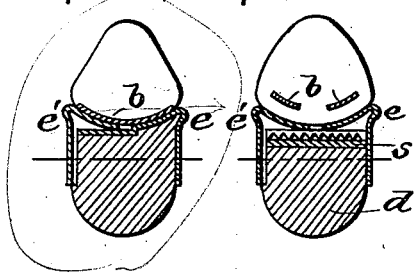
Figure 7:
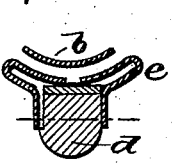
Figure 12:
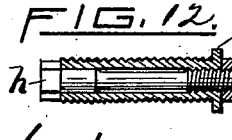
Figure 13:
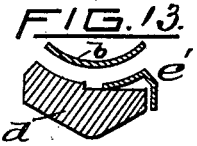
Figure 14:
Figure 15:

In the accompanying drawings, Figure 1 is a transverse section of a pneumatic tire made from sheet rubber and fabric slitted on its inner periphery. Fig. 2 is a similar section of a single-tube pneumatic tire. Fig. 3 shows a slitted tire with beaded edges. Fig. 4 is a cushion-tire. Figs. 5 and 6 are solid tires. Fig. 7 represents the essential features of the tire-securing device. Figs. 8, 9, 10, and 11 show several forms of disk wheels in transverse section. Fig. 12 shows a sleeve and bolt for securing the channel-plates to the felly. Figs. 13 and 14 show rims for use on a bicycle. Fig. 15 shows a means of securing the plates $e$ $e'$ to each other independent of the felly.

Referring to Fig. 1, $a$ is a pneumatic tire, made of sheet rubber and fabric, in the form of an endless belt and may be curved laterally and heated while held in this rounded form to impart a permanent set to the layers of rubber and fabric, so that it will be substantially tubular in form, slitted on its inner periphery. When completed, the tire is a one-piece structure, having an outer layer of rubber $a$, a lining of rubber $a'$, and fabric $a''$, interposed between the said layer $a$ and lining of rubber $a'$. $b$ is a hoop, preferably of metal, curved laterally and either endless or adjustable. $d$ is a wood felly or rim, and $e$ $e'$ are channel-plates, preferably forming continuous wedge-rings around the felly or rim, as they are more convenient to handle in this form than when several segments are used. Whether the hoop $b$ is endless or adjustable and set to a given size, it is non-extensible or fixed when in use and unchanging with respect to its diameter. The annular rings forming the tire-seat are wedge-shaped and move in a lateral direction and when forced toward each other exert a force at right angles or perpendicular to their faces. Owing to the inability of the tire to compress laterally or change its inner peripheral diameter or contour, because of the non-extensible hoop $b$, a resultant force exerted by the channeled plates is outward in a radial line. The abutting edges $c$ $c$ of the tire $a$ are thus securely clamped between the said wedge-rings $e$ $e'$ and the hoop $b$. The hoop $b$ may be vulcanized to one side of the slitted tire. The tire is held securely where it is in contact with the hoop $b$ and the wedge-rings $e$ $e'$, which together form a channeled tire-seat corresponding to the lateral curve of the hoop $b$, allow of no movement of the tire, so that injurious wear and chafing are impossible. S is a band shrunk onto the felly in the usual manner. This fastening device is not limited to the securing of the form of tire above described and as shown in Fig. 1, but is applicable to other constructions which include the ordinary single and double tube varieties, as well as the solid and cushion tires.

Figs. 2, 3, 4, 5, and 6 illustrate the several constructions referred to.

Instead of the hoop $b$ I may employ two hoops of less width, as shown in Fig. 6.

Referring to Fig. 2, $a\, a'\, a''$ is a pneumatic tire, familiarly known as a "single tube." $b$ is a hoop which may be vulcanized into the tire or placed therein after the tire is manufactured. $d$ is the rim of the wheel, and $e\, e'$ are channel plates or wedges. The channel-plate $e$ is shrunk onto the wood felly in the ordinary way and is therefore immovable. The clamping and releasing of the tire is accomplished on one side of the wheel only by the lateral movement of the oppositely-arranged channel-plate $e'$ acting as a wedge. When the hoop $b$ is vulcanized into the tire, it is not necessary to completely inclose it on all sides, as vulcanization will hold the hoop securely along the attaching-surface of the tire, as shown in Fig. 5, and the channel-plates then bear directly against said hoop $b$, thus securely holding the tire in position on the wheel. When the hoop $b$ is not attached to the exterior of the tire by vulcanization, the layers $f$ of the tire are slitted at $c$, and the said tire portions $f$ lie between the hoop $b$ and the channel-plates $e\, e'$.

In the construction shown in Fig. 2 the channel-plate $e'$ is held in position by a series of buttons or locking-pieces $l$, arranged around the wheel. To remove the plate $e'$, it is only necessary to loosen the bolts $h$ and turn the buttons $l$ out of contact with the plate $e'$. It can then be taken off of the wheel without removing or further unscrewing the clamping-bolts. If desired, removing-bolts may be used to facilitate the removal of the plate $e'$.

The description of Figs. 1 and 2 will apply to the several figures of the drawings as far as relates to the attachment of the tire, as the arrangement and action of the clamping members in the several instances are substantially the same.

Figure 8:
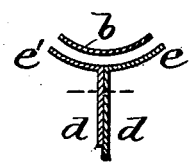
Figure 9:
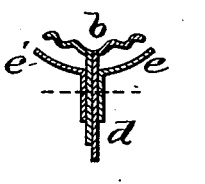
Figure 10:
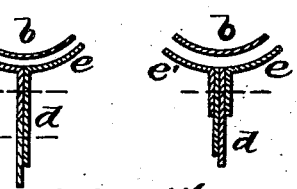
Figure 11:
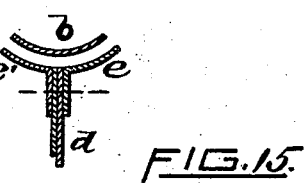

In Figs. 8, 9, 10, and 11 the modifications shown are in the form of disk wheels, which may consist of the two disks $d\, d$, the channel-plates $e\, e'$, and hoop $b$, the disks in Fig. 9 being bent over to perform the same function as the hoop $b$, and in Fig. 8 they form the channel-plates $e\, e'$, and in Fig. 10 one channel-plate $e$ only is formed on the disks, the remaining plate $e'$ being separable and independent. In order to more securely hold the tire in position with comparatively light pressure between the hoop $b$ and channel-plates $e\, e'$, I may form some part of the clamping-surfaces $b$ or $e\, e'$ with corrugations or the equivalent (see Fig. 9) and make the holding edges $f$ of the tire correspondingly shaped. Instead of corrugations I may form beads on the attaching edges of the tire, with a recess and shoulder on one or the other or all of the clamping members $b$ and $e\, e'$. Fig. 3 shows shoulders in the channel-plates $e\, e'$.

The inflation of the tires is accomplished by means of an ordinary valve, which in the construction shown in Fig. 1 is secured to the hoop $b$ and in Fig. 2 is attached to the air-tube $a'$ in the ordinary way.

When both of the channel-plates $e\, e'$ are adjustable, a preferred means of securing them to the rim consists of the hollow sleeve $g$, having a thread on its exterior surface that holds it and the side plate $e$ securely in position in and on the rim. A screw $h$ engages with the interior of the hollow sleeve $g$, and not only holds the remaining plate $e'$ in its position, but acts as a check or lock for the sleeve $g$. If desired, a nut $i$ can be used as a check on and for the screw $h$, as shown in Fig. 12, where the screw $h$ is shown passing through the hollow sleeve $g$. This check-nut $i$ may be made in the form of a cap to cover the end of the screw $h$.

In Fig. 13, $b$ is the hoop and $d$ the felly or rim, which forms one side of the channel. $e'$ is preferably made of metal and forms the opposite side of the channel. In this construction the tire is removed and replaced on one side of the rim only. This is also the case with relation to Figs. 2 and 5, and the same arrangement may be carried out in all of the several constructions and modifications.

In Fig. 14 the channel-plate $e'$ is preferably secured to the rim by means of a screw-thread $k$.

Referring to Figs. 1 and 3, I make an airtight joint by means of the pressure between the hoop $b$ and plates $e\, e'$. I may also use a packing-strip of unvulcanized rubber, cemented or otherwise secured to one edge of the tire $a$. This packing-strip would lie between the clamping-surfaces $b$ and $e\, e'$. These two constructions can be used as double-tube tires by the addition of a separate air-tube, and the method of securing the tires to the rim can be adapted to all known forms of tires.

In order to provide against the loosening of the tire on the wheel from the expansion of the hoop $b$ in a warm atmosphere and an excessive pressure upon its contraction in a cold atmosphere, I may provide ribs or corrugations on the inner periphery of the tire, as shown in Fig. 4, so that the tire may be held securely in a warm atmosphere and allow of an easy compression of the attaching-surface of the tire upon the contraction of the hoop $b$. Another means of accomplishing the same end is illustrated in Fig. 6. The hoop $b$ and channel-plates $e\, e'$ are each preferably made of the same material and thickness, so that the expansion and contraction will be more nearly equal. A corrugated band of rubber or other compressible material is placed around the rim $d$ and interposed between it and the channel-plates $e\, e'$.

Referring to Fig. 15, the plate $e$ has threaded lugs $n$ projecting beyond the felly, and the plate $e'$ is secured to the plate $e$ by nuts $p$ engaging the lugs $n$. Buttons $l$ may be used, such as shown in Fig. 2. The lugs $n$ may be integral with the plate $e$ or secured thereto in any suitable manner.

It is preferred to make the channel-plates $e$ $e'$ in the form of annular wedges; but I do not limit myself to this construction, as it is obvious that the plates may be made up of segments or wedge-pieces, which will secure the tire on the rim, if they are themselves properly and adjustably secured to the rim.

I am aware that an expanding rim or felly in one or more pieces having cross-openings or expanding joints for the purpose of increasing the circumference of the rim is old, and I make no claim to such a construction.

I claim as my invention—

1. The combination with a wheel-rim of a tire having a fixed inner diameter and radially-expanding means forming a seat for said tire, and interposed between said rim and tire for tightening the tire on the rim.

2. A tire having a fixed inner diameter at its attaching-surface, in combination with channel rings or wedges the inclined portions of which extend inwardly under the tire, forming the tire-seat, one or all of the wedges being adjustable laterally to exert a radially-expanding force against the fixed inner diameter of the tire to hold it on the wheel, substantially as described.

3. The combination of a wheel-rim, a tire having a rigid base, and an annular wedge formed of two members mounted the one upon the other to slide in a straight line and interposed between said rim and tire; substantially as described.

4. In combination, a wheel-rim having wedging portions forming an adjustable seat for a tire, a tire having a rigid inner periphery to fit said tire-seat, and means for adjusting the wedging portion in intimate and radially forceful contact with the rigid inner periphery of the tire.

5. A tire for vehicle-wheels having an attaching-surface unchanging with respect to its diameter, in combination with wedge-shaped channel-rings forming the tire-seat, one or both of the rings adjustably secured to the rim of the wheel to exert a radially-expanding force against the attaching portion of the tire and hold it in position on the wheel, substantially as described.

6. A wheel-tire substantially circular in cross-section having a fixed inner periphery in combination with one or more wedge-rings, forming the surface on which the tire seats, the rings being independent of and conforming substantially to the curvature of the tire, and adjustably secured to the wheel-rim, as and for the purpose specified.

7. A means of attaching tires to vehicle-wheels consisting of an annular hoop unchanging with respect to its diameter, the said hoop attached to or carried by the tire in combination with two rings, each forming substantially one-half of a channeled tire-seat, one or both of said rings having a lateral adjustment, the said rings exerting a radially-expanding force in the direction of the annular hoop upon the lateral adjustment of one or both of the rings, substantially as described.

8. A means of securing tires to vehicle-wheels consisting of a metal band or ring secured to a rim and forming a portion of a channeled tire-seat, a laterally-adjustable wedge-ring forming the opposite side of the tire-seat, a tire having an attaching portion of fixed diameter, substantially corresponding in shape to the said tire-seat, in combination with suitable devices to cause a lateral adjustment of the wedge, and thereby firmly lock the tire in its seat, substantially as described.

9. A means of attaching tires to vehicle-wheels, consisting of a felly or rim, adjustable channel-rings, forming a seat for the tire, a tire with a rigid attaching portion corresponding in shape to the said tire-seat, and suitable bolts to draw and hold the said tire-seat in a radially forceful contact with the rigid attaching portion of the tire, substantially as described.

10. A pneumatic tire comprising an endless ring of rubber and fabric having a substantially tubular form slitted on its inner periphery, in combination with a non-extensible metallic hoop lying along the interior attaching-surface of the tire, and a channeled tire-seat formed of one or more laterally-adjustable wedging-plates that exert an expanding force radially to clamp the tire between the said plates and the hoop, substantially as described.

11. A pneumatic tire having, or provided with a non-extensible attaching portion, unchanging with respect to its diameter, in combination with a rim or felly provided with channel-rings which together form a seat for the tire, the said rings when carried toward each other serving to radially clamp and retain the non-extensible attaching portion of the tire substantially as and for the purpose described.

12. A wheel-tire having or provided with a non-extensible attaching-hoop, unchanging with respect to its diameter, in combination with a rim or felly having one or more laterally-adjustable wedging-plates, which serve to clamp the attaching portion of the tire radially between the said hoop and plates as the latter approach each other by means of the said lateral adjustment.

13. A wheel-tire provided, at its attaching portion, with a non-extensible hoop, in combination with a rim or felly having laterally-adjustable channel-rings which act as wedges to radially clamp and hold the attaching portion of the tire upon the near approach of the rings, by means of the said lateral adjustment.

14. A wheel-tire having a non-extensible reinforcement located at, in or on its attaching-surface, the whole being secured to the wheel by one or more laterally-adjustable channel-plates acting as a wedge or wedges between the rim and the attaching-surface of the tire, substantially as described.

15. In combination with a tire having a rigid inner periphery unchanging with respect to its diameter, a felly or rim provided with wedging-plates having a curved tire-seating surface, and means substantially as described to force the said rigid inner periphery of the tire and the said curved seating-surface of the plates into intimate and radially forceful contact to lock the tire upon the rim or felly.

16. A means for securing annular wedges between a wheel-rim and tire, comprising a bolt seated in the rim, and a locking-plate rotatably mounted on the bolt and extending therefrom to bear at one end upon the rim and at the other end upon the annular wedge; substantially as described.

17. A means of securing tires to wheel-rims, consisting of a tire having a fixed base or attaching portion, in combination with wedge-rings adjustably secured to the rim of the wheel, and that snug up between the wheel-rim and the base of the tire upon a proper adjustment of the wedge-rings, substantially as described.

In testimony whereof I have signed my name to this specification in the presence of two subscribing witnesses.

PARDON W. TILLINGHAST.

Witnesses:
ANDREW J. PITCHER,
JOHN S. LYNCH.